US011475535B2

(12) United States Patent
Piat et al.

(10) Patent No.: US 11,475,535 B2
(45) Date of Patent: Oct. 18, 2022

(54) PET-CT REGISTRATION FOR MEDICAL IMAGING

(71) Applicant: Siemens Medical Solutions USA, Inc., Malvern, PA (US)

(72) Inventors: Sebastien Piat, Lawrence Township, NJ (US); Julian Krebs, Moers (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 260 days.

(21) Appl. No.: 16/868,338

(22) Filed: May 6, 2020

(65) Prior Publication Data

US 2021/0090212 A1    Mar. 25, 2021

Related U.S. Application Data

(60) Provisional application No. 62/905,636, filed on Sep. 25, 2019.

(51) Int. Cl.
*G06T 3/00* (2006.01)
*G06N 3/04* (2006.01)
*G06N 3/08* (2006.01)
*G06T 11/00* (2006.01)

(52) U.S. Cl.
CPC ......... *G06T 3/0068* (2013.01); *G06N 3/0454* (2013.01); *G06N 3/088* (2013.01); *G06T 11/008* (2013.01)

(58) Field of Classification Search
CPC ... G06T 3/0068; G06T 11/008; G06T 11/005; G06N 3/0454; G06N 3/088; G06N 3/0472; G06N 3/08

USPC ......................................................... 382/131
See application file for complete search history.

(56) References Cited

U.S. PATENT DOCUMENTS

| | | | |
|---|---|---|---|
| 2013/0034286 A1* | 2/2013 | Vija | G06T 7/32 382/131 |
| 2015/0036789 A1* | 2/2015 | Panin | G06T 11/006 378/4 |
| 2019/0130569 A1* | 5/2019 | Liu | G06T 7/0014 |
| 2019/0266728 A1* | 8/2019 | Lee | G06T 11/005 |
| 2019/0392265 A1* | 12/2019 | Spottiswoode | A61B 6/5235 |
| 2020/0126231 A1* | 4/2020 | Hu | G06T 11/008 |
| 2020/0211236 A1* | 7/2020 | Zhang | G06N 3/084 |
| 2021/0081778 A1* | 3/2021 | Cachovan | G06V 10/811 |

OTHER PUBLICATIONS

Alessio, Adam M., et al. "Attenuation-emission alignment in cardiac PET/CT based on consistency conditions." Medical physics 37.3 (2010): 1191-1200.

(Continued)

*Primary Examiner* — Van D Huynh

(57) ABSTRACT

CT and PET are registered, providing a spatial alignment to be used in attenuation correction for PET reconstruction. A model for machine learning is defined to generate a deformation field. The model is trained with loss based, in part, on the attenuation corrected PET data rather than or in addition to loss based on the uncorrected PET or the generated deformation field. Due to the nature of the mapping from CT to attenuation, a separate, pre-trained network is used to form the attenuation corrected PET data in training the model.

14 Claims, 3 Drawing Sheets

(56) References Cited

OTHER PUBLICATIONS

Pan, Tinsu, et al. "Attenuation correction of PET images with respiration-averaged CT images in PET/CT." Journal of Nuclear Medicine 46.9 (2005): 1481-1487.

Shekhar, Raj, et al. "Automated 3-dimensional elastic registration of whole-body PET and CT from separate or combined scanners." Journal of Nuclear Medicine 46.9 (2005): 1488-1496.

* cited by examiner

PET-CT REGISTRATION FOR MEDICAL IMAGING

RELATED APPLICATION

The present patent document claims the benefit of the filing date under 35 U.S.C. § 119(e) of Provisional U.S. Patent Application Ser. No. 62/905,636, filed Sep. 25, 2019, which is hereby incorporated by reference.

BACKGROUND

The present embodiments relate to positron emission tomography (PET). In PET, an unstable radionuclide emits a positron, which collides with an electron resulting in annihilation of mass and emission of energy in form of two photons (gamma radiation). The PET image acquisition is based on almost-simultaneous detection of these two photons, which creates a detected event along a line of response (LOR). These registered LORs are used for image reconstruction.

For more accurate imaging and/or quantification, the attenuation of the photons through tissue is accounted for in reconstruction. The degree of attenuation is related to a cumulative attenuation coefficient of tissue across the LOR. An attenuation map is extrapolated from computed tomography (CT) data. Misalignment of non-attenuation corrected (NAC) PET and CT images is present in approximatively 50% of these scans. When PET/CT misalignment is present, the quantification of standardized uptake value (SUV) may not be feasible and/or artifacts may be generated.

The misalignment may be corrected by registration. While respiratory motion compensation techniques are available for both PET and CT, the two scans are acquired separately and registration between PET and CT is largely ignored. Classic mutual information registration approaches have limited effect. Integrated reconstruction techniques, such as maximum likelihood reconstruction of activity and registration of attenuation (MLRR), are limited by image noise and reconstruction times. Other optimization approaches are based on consistency conditions between the attenuated and the original PET. The consistency conditions may be inefficient to compute and require very powerful hardware even when focusing on a specific anatomy.

SUMMARY

By way of introduction, the preferred embodiments described below include methods, systems, and non-transitory computer readable media for attenuation correction in positron emission tomography. CT and PET are registered, providing a spatial alignment to be used in attenuation correction for PET reconstruction. A model for machine learning is defined to generate a deformation field. The model is trained with loss based, in part, on the attenuation corrected PET data rather than or in addition to loss based on the uncorrected PET or the generated deformation field. Due to the nature of the mapping from CT to attenuation, a separate, pre-trained network is used to form the attenuation corrected PET data in training the model.

In a first aspect, a method is provided for attenuation correction in positron emission tomography. A positron emission tomography (PET) scanner acquires PET data along lines-of-response from emissions in a patient. A computed tomography (CT) scanner acquires CT data for the patient. A machine-learned model aligns the CT data with the PET data. The machine-learned model was trained based on comparison of generated PET images formed with alignment output by the model to ground truth PET images. An attenuation corrected PET image of the patient is reconstructed from the PET data. The reconstruction is a function of an attenuation map from the CT data after the aligning. The attenuation corrected PET image is displayed.

The alignment spatially registers the CT data with the PET data. The machine-learned model outputs a deformation field for alignment in response to input of the CT data and the PET data to the machine-learned model.

The machine-learned model may be one of various models, such as a neural network for deep learning. In one embodiment, the machine-learned model is a generator of a generative adversarial network. The discriminator of the generative adversarial network performed the comparison when the generator was trained. In a further embodiment, the generator was also trained based on similarity of landmark location.

In another embodiment, the machine-learned model was trained using a machine-learned network configured to output an attenuation corrected PET dataset in response to input of CT information and PET information. For example, the machine-learned network was not trained with the machine-learned model and is not used in aligning the CT data with the PET data for the patient.

In other embodiments, the reconstruction alters the PET data based on the attenuation map. The image is reconstructed from the altered PET data.

In a second aspect, a method is provided for machine training registration of computed tomography (CT) with positron emission tomography (PET). A generative adversarial network is defined as a generator and a discriminator. The generator outputs a deformation field for the registration, and the discriminator discriminates for attenuation corrected PET data. The generative adversarial network is trained, such as machine trained. The generator of the trained generative adversarial network is stored.

In one embodiment, the generative adversarial network is defined as a neural network, and the discriminator is defined as another neural network with convolutional and fully-connected layers.

In an embodiment, the training includes forming the attenuation corrected PET data using the deformation field with a machine-learned attenuation correction network fixed during the training of the generative adversarial network.

In other embodiments, the training includes training with a similarity loss for the generator and a quality of the attenuation corrected PET data for the discriminator.

For application, the generator aligns CT data for a patient with PET information for the patient. The alignment is performed without the discriminator.

In a third aspect, a method is provided for machine training registration of computed tomography (CT) with positron emission tomography (PET). A model is defined to output a deformation field in response to input of CT data and PET data. The model is machine trained using a machine-learned network configured to output an attenuation corrected PET in response to input of the deformation field. The machine-trained model is stored.

In an embodiment, the model is defined as a generative adversarial network having a generator and a discriminator. The generator outputs the deformation field for the registration, and the discriminator discriminates for attenuation corrected PET data formed using the deformation field. In a further embodiment, the generator is trained based on discrimination by the discriminator of a quality of the attenuation corrected PET data and based on a similarity from the deformation field.

In another embodiment, the machine-learned network used in the machine training was previously trained and fixed during the machine training of the model.

In yet another embodiment, the machine-trained model aligns CT information for a patient with PET information for the patient. A PET image is reconstructed from the PET information using an attenuation map from the CT information as aligned.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

PET-CT registration is based on a model machine-trained using learned attenuation correction. For example, a deep learning framework learns its own metric for evaluating the quality of the attenuation corrected PET in a generative adversarial network (GAN). The quality of the attenuation corrected PET computation is included as a part of the loss for the training of a PET/CT registration framework. This quality is incorporated using the discriminator of the GAN. An example discriminator uses a succession of convolutional layers, providing more efficient loss determination than using a more processing costly consistency condition evaluation. The training focuses directly on the end goal of deformable registration between PET and CT, which end goal is accurate attenuation correction for PET scans or accurate attenuation corrected PET images.

The attenuation correction algorithm is a piece-wise linear mapping computed from the CT to the PET image, which cannot be integrated in a deep learning framework as it is not differentiable in the support of the image values. This mapping is learned by a separate neural network, hence enforcing differentiability and making the attenuation correction usable in a deep learning framework, such as the GAN.

The attenuation correction algorithm is integrated directly in a training pipeline. The integration may result in higher accuracy to deformable registration frameworks. The evaluation system based on PET information is more efficient than optimizing based just on the deformation. The attenuation correction algorithm is separately trainable, so may be used in any other machine learning framework.

Figure 1:
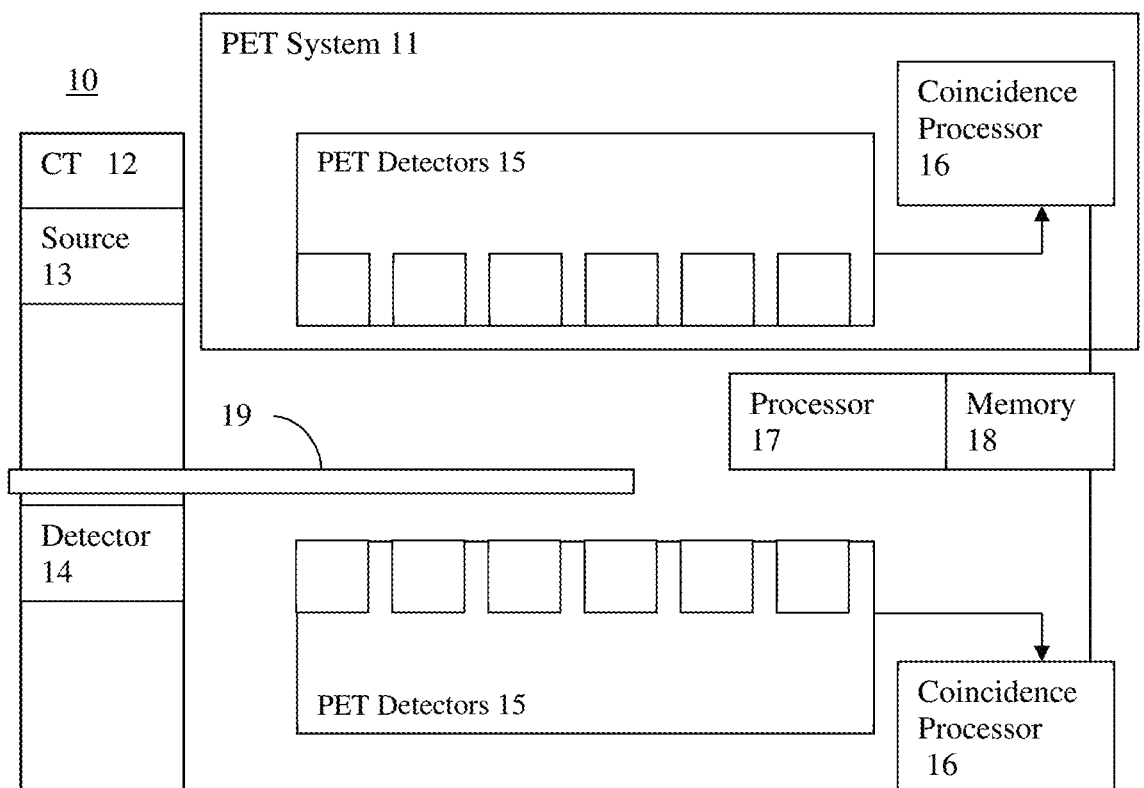
FIG. 1 is a block diagram of a system, according to one embodiment, for PET imaging using CT for attenuation correction.

FIG. 1 shows one embodiment of a system for PET imaging. The system is a combined PET-CT system 10 where CT is used for attenuation correction and for structural information in reconstruction for localization of activity concentration. Any PET-CT system 10 may be used.

The PET-CT system 10 includes a CT scanner 12 and PET system 11. The PET system 11 includes rings of detectors 15, a bed 19, coincidence processors 16, a memory 18, and an image processor 17. The processor 17, memory 18, and/or a display are part of the PET system 11 or are separate (e.g., a computer or workstation). Additional, different, or fewer components may be provided. For example, the system is a computer without the detectors 15 and bed 19, instead relying on data acquired by a separate scanner. As another example, the PET-CT system 10 includes power supplies, communications systems, and user interface systems.

The CT system 12 includes an x-ray source 15 and opposing detector 17 mounted in a gantry. The CT system 12 is an x-ray scanner configured to obtain attenuation data (e.g., measures of tissue density in Hounsfield units) for a patient volume. The gantry moves the source 15 and detector 17 about the patient for scanning. The processor 17 or a different processor computes the attenuation of the x-rays at different voxels within the scan volume. Any now known or later developed CT system 12 may be used. Other x-ray scanners, such as a CT-like C-arm scanner, may be used.

The CT system 12 is within a same housing as the PET system 11 or is spaced apart by and connected by a common track for the bed 19. Completely separate CT system 12 and PET system 11 may be used.

The bed 19 is a gurney, table, or other support to hold an examination subject, such as a patient. A robot, gears, cable, track, and/or other device may move the bed 19 between a position for CT scanning and a position for PET scanning. One or more different stationary bed positions or continuous bed motion may be used to scan the patient for PET emissions.

The PET detectors 15 are crystals or other photon detectors. For example, the detectors 15 are scintillation crystals coupled to avalanche photo diodes. In other embodiments, scintillation crystals are coupled with photomultiplier tubes. The scintillation crystals are bismuth germanium oxide, gadolinium oxyorthosilicate, or lutetium oxyorthosilicate crystals, but other crystals may be used.

The PET system 11 is a nuclear imaging system. The detectors 15 detect gamma rays emitted indirectly by a positron-emitting tracer. Pairs of gamma rays generated by a same positron annihilation event may be detected using the ring of the detectors 15. The pairs of gamma rays travel about 180 degrees apart. If the direction of travel intersects the arrangement of detectors 15 at two locations, a coincident pair may be detected. To distinguish specific pairs, the coincidence of detected gamma rays is determined. The timing of receipt is used to pair the detected gamma rays. The timing, as prompt data, may also indicate the time of flight (TOF), providing information about where along a line of response the emission occurred.

Each individual detection output from the detectors 15 includes energy, position, and timing information. Alternatively, the detectors 15 output energy information and a receiving coincidence processor 16 determines the timing and position (e.g., based on port assignment or connections).

The timing information is used to determine coincidence of detection by different detectors 15 by the coincidence processors 16 with or without also determining a general position along the LOR of the emission based on TOF. Pairs of gamma rays associated with a same positron emission are determined. Based on the detected event, a LOR is determined from the detectors involved in the detection of that event.

The detected events are passed to the memory 18 and/or processor 17. The processor 17 connects with the detectors 15, such as through the coincidence processors 16. The processor 17 also connects with the CT system 12 to receive attenuation and/or structural information.

The image processor 17 is a general processor, digital signal processor, graphics processing unit, application specific integrated circuit, field programmable gate array, artificial intelligence processor, digital circuit, analog circuit, combinations thereof, or other now known or later developed device for processing detected LOR events, registering CT with PET, generating attenuation maps, and/or reconstructing. The processor 17 is a single device, a plurality of devices, or a network. For more than one device, parallel or sequential division of processing may be used. Different devices making up the processor 20 may perform different functions, such as one processor for handling LOR emission information, registration, and correction and another processor for reconstructing the object (i.e., patient). In one embodiment, the processor 17 is a control processor or other processor of the PET-CT system 10 or the PET system 11. In other embodiments, the processor 17 is part of a separate workstation or computer or part of the CT system 12.

The processor 17 operates pursuant to stored instructions to perform various acts described herein. The processor 17 is configured by software, design, firmware, and/or hardware to perform any or all of the acts of FIG. 4.

The processor 17 is configured to register or align the CT data with the PET data. This spatial rigid or non-rigid deformation accounts for movement by the patient, changes in the patient, breathing motion, and/or inaccuracies in bed position. To register, the processor 17 applies a machine-learned model. The machine-learned model outputs a deformation field to deform the CT data and/or PET data or outputs CT data with intensities shifted according to a deformation. The output is based, in part, on the machine training used to create the model. Differences in architecture of the machine-learned model and/or data used for training may result in differences in the output deformation field or deformed data.

The processor 17 is configured to generate a PET image from the PET scan using attenuation corrections of the PET data based on the aligned CT data. The measured emissions are corrected for attenuation. The correction is performed as part of reconstruction. The PET data is corrected in the projection domain (by LOR), and then the corrected PET data is iteratively reconstructed into the object or image domain. Alternatively, the PET data is reconstructed into the image or object domain, such as for each iteration, and then the PET data in the object domain is corrected for attenuation.

The processor 17 is configured to reconstruct the activity distribution using attenuation corrected emissions along the lines of response. TOF is or is not used. The structural information from CT data may be used in the PET reconstruction to localize activity. The processor 17 is configured to generate a PET image from the detected emissions of the PET scan corrected using the estimated attenuations. PET data representing a plane is mapped to display values. Alternatively, PET data representing a volume is three-dimensionally rendered to a two-dimensional display, such as with projection or surface rendering. The PET image may or may not include, overlay, or be displayed adjacent to a CT image representing the patient.

The detected events, LOR information (e.g., sinograms), time step, prompt data, attenuation information, CT data, attenuation map, machine-learned model, reconstructed data, image, PET data, attenuation corrected PET data, PET image, and/or other data is stored in the memory 18. The data is stored in any format. The memory 18 is a buffer, cache, RAM, removable media, hard drive, magnetic, optical, database, or other now known or later developed memory. The memory 18 is a single device or group of two or more devices. The memory 18 is part of the PET system 11 or a remote workstation or database, such as a PACS memory.

The memory 18 is additionally or alternatively a non-transitory computer readable storage medium with processing instructions. The memory 18 stores data representing instructions executable by the programmed processor 17 for attenuation correction in PET or by an image processor for machine training. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The PET system 11 may include a display. For example, the processor 17 reconstructs the patient or object being scanned from the LOR and attenuation data. The reconstruction is used for three-dimensional rendering, multi-planar reconstruction, or two-dimensional imaging of the function of the object or patient. The images are displayed on the display. The display is a CRT, LCD, plasma screen, projector, printer, or other output device for showing an image.

Figure 2:
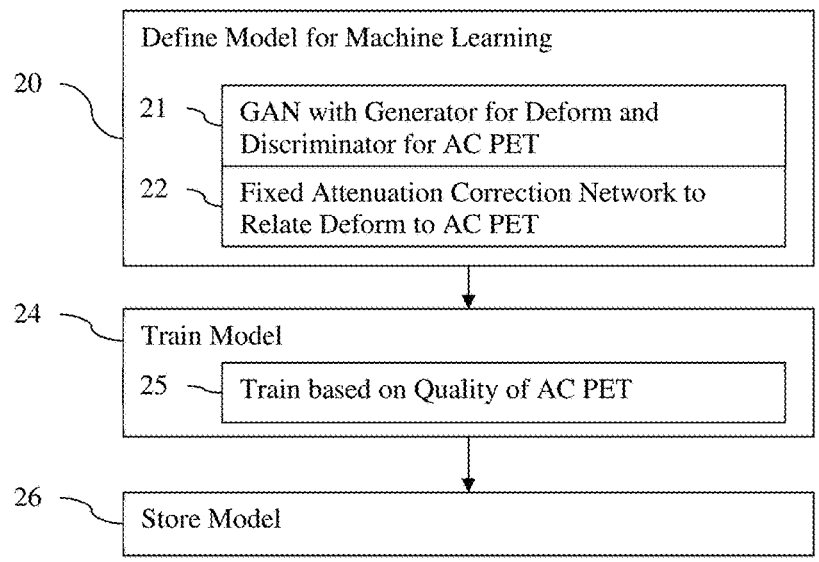
FIG. 2 is a flow chart of an embodiment of a method for machine training for registration in attenuation correction in PET.

FIG. 2 shows a method for machine training registration of CT with PET. A model is trained to generate a deformation field given CT data and PET data. The model is trained based on a quality of attenuation corrected PET data or image generated using the deformation field. A separate machine-learned network for generating attenuation corrected PET from the CT and PET data may be used in the training but is not used in application of the machine-learned model to generate the deformation field for a patient. The deformation field is used to align the attenuations from CT with PET for attenuation correction in reconstruction of a PET image.

The method of FIG. 2 is implemented by a computer, workstation, server, or another image processor. A memory is used to store the machine-learned model and training data. The image processor trains the model, which is defined through user interaction with the image processor.

Additional, different, or fewer acts may be performed. For example, act 26 is not performed. As another example, one or both of acts 21 and 22 are not performed. Act 25 may not be used in other embodiments.

The acts are performed in the order shown (numerical or top-to-bottom) or a different order.

In act 20, a model to output a deformation field in response to input of CT data and PET data is defined. The user inputs an architecture of the model to be used in machine training. Different building blocks, such as neural network layers, activation functions, nodes, and/or other groupings, are linked together. Learnable parameters may be defined, including limits on the parameters. Fixed parameters or set values may be included or not in the definition of the architecture. Connections and weights may be defined. A default or pre-programmed model may be selected. The model may be formed by alteration of another model, such as provided in pre-training.

The model is a neural network, such as a convolutional neural network or a fully connected neural network. In one embodiment, the model is a generative adversarial network (GAN) including a generator and a discriminator. In other embodiments, the network is a U-net, encoder-decoder, or another image-to-image network. For a GAN, the generator may be a U-net, encoder-decoder, variational autoencoder, conditional variational autoencoder, or other network. Support vector machines or other machine learning models may be used.

The model is defined to output the deformation field, deformed CT or PET data (i.e., spatially transformed for alignment) or other alignment of the CT data with the PET data. In one embodiment, the model is defined as a GAN, so has a generator and discriminator for training. The generator is formed as a neural network, such as formed from down sampling, up sampling, pooling, convolutional, and/or other layers in a U-net or another arrangement with or without skip connections. The discriminator is formed as a neural network, such as a sequence of convolution layers with an output softmax layer.

The generator is defined to output a deformation field to be used for registration or spatially transformed CT or PET data. The deformation field non-rigidly relates the spatial locations of the CT data to the spatial locations of the PET data. The deformation field may be represented by vectors by location (e.g., pixel or voxel) for the direction and magnitude for change in spatial location of the CT intensity (e.g., density). Other representations may be used, such as diffeomorphic representation provided by a velocity field, v, and a diffeomorphic deformation field, $\phi$. The generator may output pointwise velocities v, which are then processed into a diffeomorphic deformation representation. In one embodiment, the generator is defined to regress the deformation field that will be used to warp the CT image, which will then be used to compute the attenuation corrected PET.

The discriminator is defined to discriminate attenuation corrected PET data. The discriminator determines whether an input PET image or data is an image or data formed with registration from the generator or a high-quality attenuation corrected PET image or data without artifacts from misregistration. In iterative training where the discriminator output is used to control the training for the generator, and the generator output is used to train the discriminator in a back-and-forth or iterative manner, the generator learns to output deformation fields that make it difficult for the discriminator to discriminate, and the discriminator learns to discriminate more effectively. The discriminator evaluates the quality of the attenuation corrected PET computed with the CT aligned based on the generator output compared to samples of attenuation corrected PET computed with well aligned PET and CT scans.

The model is defined in act 20. Acts 21 and 22 provide parts of the definition that may further assist in machine learning to generate the deformation field or deformed data. In act 21, the discriminator of the GAN is used to include the final result of an attenuation corrected PET data or image in learning to provide the deformation field. Rather than relying just on a loss based on the deformation field, the model is defined in a way that includes loss based on the end use of the deformation field, the generated PET data after attenuation correction. Proper registration is less likely to provide poor quality attenuation corrected PET image. Rather than using a discriminator, the deformation field may be used in reconstruction and/or attenuation correction. The attenuation corrected PET data is then compared against ground truth attenuation corrected PET data to provide a loss.

In act 22, a separate attenuation correction network is provided to relate the deformation field to the attenuation corrected PET data or image. Instead of relying on processing intensive attenuation mapping and reconstruction for the hundreds or thousands of training samples used in machine learning, the attenuation mapping (i.e., CT measured Hounsfield to tissue attenuation at 511 KeV) and/or reconstruction from the attenuation corrected PET data using the mapping are replaced or provided by a machine-learned network. The machine-learned network may operate more efficiently (i.e., less processing) once trained to perform these acts.

Figure 3:
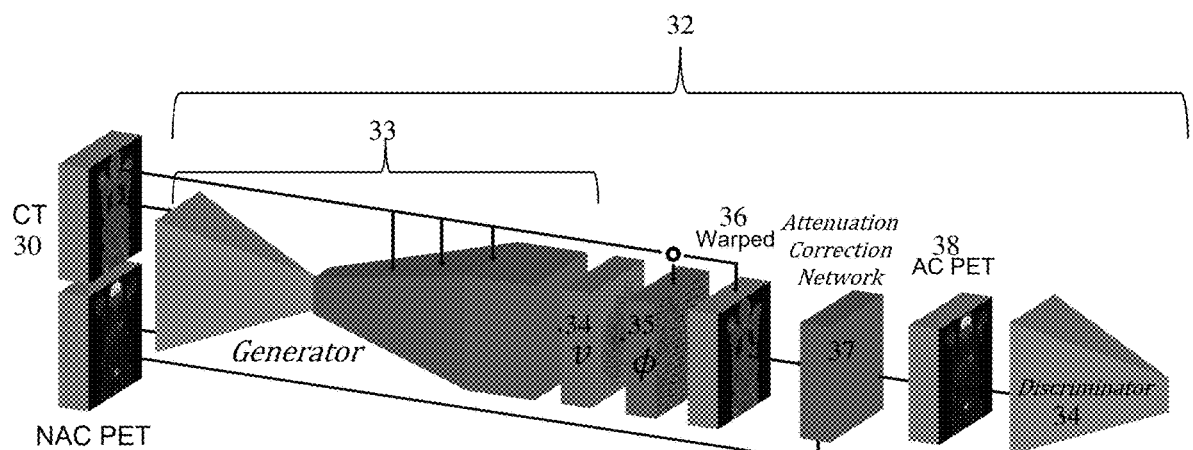
FIG. 3 is an example model architecture for machine training for registration in attenuation correction.

FIG. 3 shows an example defined model for machine learning. The model is a GAN 32 formed from a generator 33 and a discriminator 34. The generator 33 is defined to receive the CT data 30 and the non-attenuation corrected (NAC) PET data 31 as input. The generator 33 is an encoder-decoder or U-net. The CT data 30 may be down sampled for input to different layers of the decoder to assist in generating the deformation field. The deformation field is output as the velocity 34 and angle 35. The learnable parameters are in the generator 33 and the discriminator 34. The output deformation field is used to warp the CT data 30, providing the warped CT data 36. This warped CT data 36 and the measured or NAC PET data are input to the attenuation correction network 37.

The attenuation correction network 37 is a previously trained neural network or other machine-learned model for generating attenuation corrected PET data 38 from input of the measured NAC PET data 31 and the warped or registered CT data 36. The attenuation correction network 37 is a fixed network where the values of the learnable parameters are set or do not change based on the training of the generator 33 and/or discriminator 34. The attenuation correction network 37 is a machine-learned network, so quickly and efficiently performs the conversion from the input data including the PET data in the projection or LOR domain to the output attenuation corrected PET data. The attenuation corrected PET data may be corrected data in the LOR or sinogram domain (i.e., the network 37 performs mapping and attenuation correction). Alternatively, the attenuation corrected PET data is corrected PET data in a reconstructed or object domain (i.e., the network 37 performs mapping, correction, and reconstruction).

The discriminator 34 is defined to discriminate between the attenuation corrected PET data based on the registration or alignment from the generator 33 and known good quality attenuation corrected PET data. The comparison occurs in the object domain, such as between planar or voxel representations of patients or between images generated for display. Alternatively, the comparison occurs in the LOR or sinogram domain. The discriminator 34 operates on the end result of attenuation correction or attenuation correction and reconstruction so that the generator 33 is trained to provide deformation fields that maximize the quality of the attenuation corrected PET data or image rather than just the quality of the spatial transformation.

In act 24 of FIG. 2, an image processor, such as a workstation or server, machine trains the defined model, such as machine training the generative adversarial network. The machine training uses training data. Hundreds or thousands of samples are obtained, such as from experimental scans, scans of phantoms, simulations, computerized health records, a publicly available database, and/or another source. Each sample includes CT data and PET data as well as a ground truth deformation field and/or warped (aligned) CT or PET data. The training data also includes attenuation corrected PET data or images with good quality. These attenuation corrected PET data or images may or may not be from the samples of CT data and PET data used to train the generator.

The machine training uses the samples to learn values of learnable parameters of the defined model. Using optimization, such as Adam, the values are determined by iteratively varying the values to find a combination that provides output best matching the ground truth given the range of inputs in the training data. In one embodiment, deep learning of a defined neural network is performed. Other types of machine learning may be used. Supervised learning (e.g., using ground truth for loss from the generator), unsupervised learning (e.g., using a measure such as output by the discriminator as a binary, three or more levels, or continuous scale of likelihood of being known quality attenuation corrected PET or attenuation corrected PET based on deformation field output by the generator), or semi-supervised learning may be used.

In the GAN embodiment, the generator 33 and the discriminator 34 are iteratively trained. For example, the generator 33 is trained based on loss including feedback from the discriminator 34. The discriminator 34 is then trained using the, at least partially, trained generator 33. This process is repeated multiple times to complete training. Once the training is complete (e.g., optimization minimizes the losses to a threshold level for the generator 33 or both the discriminator 34 and the generator 33), the values of the learnable parameters are fixed or set. The machine-learned model is used for application for a patient. The values are fixed for application so do not change, at least for application to one or more patients in a clinical environment. The machine-learned model is used to generate deformation fields or registered data for patients for diagnosis, prognosis, and/or treatment. The machine-learned model may later be updated, such as retrained with additional or different training data.

In one embodiment, the defined model includes one or more previously trained models. In the example of FIG. 3, the attenuation correction network 37 uses warped CT data 36 and the non-attenuation corrected PET data 31 to generate attenuation corrected PET data 38, such as PET data in the LOR or sinogram domain or PET data in an image or representation in the object or spatial domain. The previously trained model is fixed. None of the values of parameters of the model are updated or changed during the machine training of the model, such as during the training of the GAN (e.g., the generator 33 and the discriminator 34). The attenuation correction network 37 acts as a defined function without learnable parameters in the architecture, so is fixed. In the example of FIG. 3, the machine-learned network of the attenuation correction network 37 is configured by past training to output the attenuation corrected PET 38 in response to input of the deformation field 34, 35 or warped CT data 36 and the PET data 31. While the generator 33 and/or discriminator 34 have values updated as part of training, the values of the attenuation correction network 37 are set or do not change during this training.

In one embodiment, the attenuation correction algorithm is an intensity mapping computed with a lookup table between the CT's Hounsfield units and the 511 KeV values of the non-attenuation corrected (NAC) PET data 31. This algorithm is only piece-wise linear and thus cannot be integrated into the learning of the GAN 32 as the mapping would not be differentiable. The attenuation correction network 37 is defined and trained for generating the AC PET data 38 from aligned CT data 36 and NAC PET data 31. This network 37 is trained beforehand to avoid complicating the training of the GAN 32, but may be trained with the GAN 32 in other embodiments.

The attenuation correction network 37 is used to approximate the function of attenuation correction, including mapping CT data to attenuation, attenuation correction of PET data, and reconstruction from the corrected LOR or sinogram PET data. Alternatively, one or more of these functions are implemented using PET processes without a machine-learned network for one or more (e.g., all) of these PET reconstruction functions. Other function approximation methods may be used. The actual mapping, correction, and/or reconstruction functions may be performed rather than simplifying with approximation using the machine-learned network 37. In other embodiments, the reconstruction function is not used in the registration training. Instead, the network 37 outputs the AC PET data 38 in the LOR or sinogram domain.

Act 25 represents training based on discrimination by the discriminator 34. The discriminator 34 determines a level of quality of the attenuation corrected PET data 38, which is based on the deformation field generated by the generator 33. This level of quality alone or with a similarity to ground truth of the deformation field 34, 35 are used in the loss function for training. The similarity loss for the output of the generator 33 (e.g., the deformation field 34, 35 or the warped CT data 36) and/or loss based on feedback from the discriminator 34 are used in the optimization in machine training. This incorporates the quality of the attenuation corrected PET data after reconstruction. Alternatively, the quality is based on attenuation corrected PET data 38 prior to reconstruction but after mapping and correction in the LOR or sinogram domain.

In one embodiment, the training relies on landmark-based similarity metrics. For example, bone structures may provide landmarks identifiable in both CT and PET data. Other landmarks or the similarity of the spatial distribution of the data without identification of landmarks may be used. The landmarks and intensity distribution may be used together for similarity measurement. The similarity in location is provided by correlation, mutual information, or another similarity measure. The generator 33 is trained using a similarity criterion and a spatial regularizer in one embodiment.

In act 26, the image processor stores the machine-trained model. After training, the defined architecture, values of the learnable parameters, and values of set parameters are stored. Any format may be used.

The machine-trained model is stored in a memory, such as a memory local to the image processor. Additionally or alternatively, the machine-trained model is transmitted or delivered to one or more (e.g., multiple) memories, such as at different healthcare facilities and/or PET scanners.

For application, the generator 33 is used. The discriminator 34 is used in training the generator 33 and is not needed for application. However, the discriminator may be used in application separately from the generator 33 as a metric to evaluate the quality of the attenuation corrected PET data or image. The generator 33 as trained may be stored with or without the discriminator 34. Similarly, the attenuation correction network 37 is not used in application, so may or may not be stored. Once the model has been trained, the attenuation correction network 37 and the discriminator network 34 may be discarded or not used. The PET scanner implemented attenuation correction algorithm in the clinical setting is used instead. In other embodiments, the attenuation correction network 37 is used in application, so is stored with the generator 33.

The values of the stored or trained machine-learned model are fixed. The values of the learnable parameters are set for application to PET and CT data for one or more patients. The values do not change during application for a patient. The machine-learned model may be retrained or updated using additional training data.

In application, the generator 33 is used to align CT data for a patient with PET information for the patient. For example, an image processor of the PET/CT scanner warps the CT data for the patient based on a deformation field output by the generator 33 or another machine-learned model. As another example, the image processor generates the warped CT data as an output of the generator 33 or other machine-learned model. This alignment is performed without the discriminator 34.

A PET image is reconstructed from the PET information using an attenuation map from the CT information as aligned. The aligned CT information is mapped to attenuation, which is used to correct the PET information. The PET information as corrected for attenuation is reconstructed into the object domain, such as voxel or three-dimensional spatial representation of emission activity in the patient.

Figure 4:
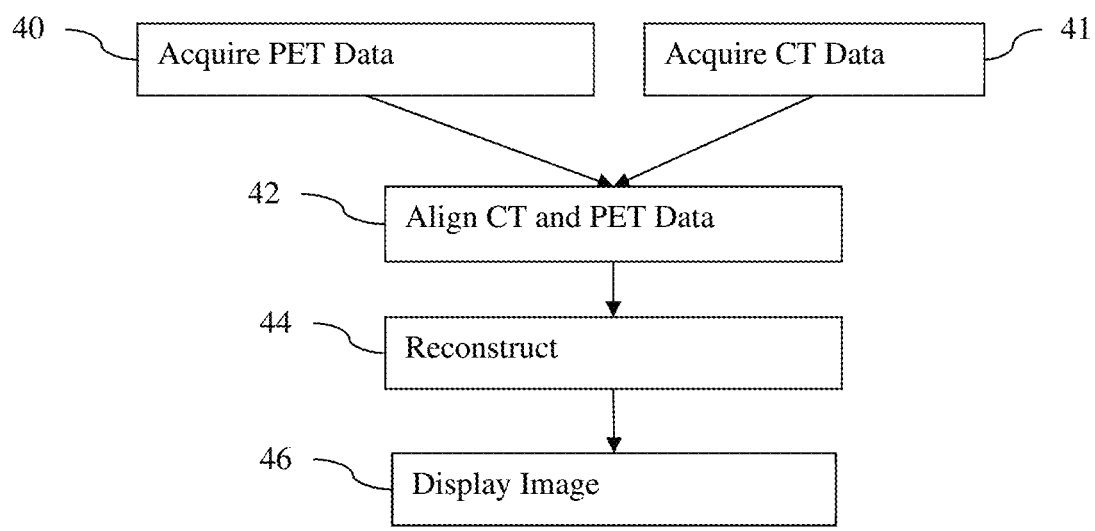
FIG. 4 is a flow chart diagram of one embodiment of a method for aligning PET and CT for attenuation correction in PET.

FIG. 4 shows one embodiment of a method for registration for attenuation correction in PET. A machine-learned model is applied to spatial register CT to PET for attenuation correction. For example, the previously trained generator 33 of FIG. 3 is used to align the CT data to PET data so that the CT data may be used to correct for attenuation of photons measured as the PET data.

The method of FIG. 4 is implemented by the processor 17, the PET system 11, the PET-CT system 10, the CT system 12, and/or other component or system. For example, the CT system 12 performs act 41, and the PET system 11 performs act 40. The image processor 17 (e.g., processor of the PET system 11) performs acts 42 and 44. The same or different processor (e.g., processor of the CT system 12) performs act 46 by generating an image, which is displayed on a display screen or printed on paper. Other devices or components may be used instead or in addition to the imaging systems and/or processors.

Additional, different, or fewer acts may be performed. For example, act 46 is not performed. As another example, act 44 is not performed. The attenuation correction is applied without reconstruction.

The acts are performed in the order shown (numerical or top-to-bottom) or a different order. Acts 40 and 41 may be performed in any order.

In act 40, the PET scanner acquires PET data along LORs from emissions within the patient. PET sinogram data is acquired. Time of flight (TOF) data for emissions detected along a plurality of LORs may be acquired. The acquisition is by scanning with the PET scanner with a plurality of detectors. In alternative embodiments, the acquisition is by transfer or upload from a memory.

Gamma rays are detected by one or more rings of detectors or other grouping of detectors. The patient ingests or is injected with a radiopharmaceutical. The radiopharmaceutical includes an isotope. The isotope decays over time, resulting in generation of a positron. LOR events from a patient are detected from emissions of photons upon annihilation of the positron.

The acquisition occurs over any period. For example, the acquisition is over 1, 10, 100, or other number of minutes. The PET scanning acquires detected emission events for functional information. The detected gamma rays are checked for coincidence. Where TOF is used, the time difference or relative timing for coincident detections is recorded as prompt data. Any time window may be used for coincidence processing, such as 0.2 microsecond coincidence time window. Each detected emission event corresponds to a line or part of a line through a patient. By detecting emission events from different angles around a patient, a volume may be reconstructed.

In act 41, a CT scanner acquires attenuation information. A CT scan of the patient is performed by the CT scanner. Other scanners to measure the attenuation at different locations or along lines through the patient may be used. Alternatively, the attenuation information is acquired from memory, such as attenuation information from a previously performed CT scan.

The CT scan is of a volume of the patient. Any range of the patient may be scanned, such as from the hips to the neck. The entire patient may be scanned. The CT scan provides measures of attenuation of the x-ray energy at different locations, such as voxels, within the patient. The attenuations of the voxels are computed by tomography from a sequence of x-ray scans from different angles through the patient. The resulting CT intensity data represents voxels of the CT scan volume. Alternatively, the CT intensity data is projected along LORs to form CT intensities in the projection domain.

The CT data is a measure in Hounsfield units. This represents the density of the tissue at different locations or along lines. The CT data may be converted or mapped to attenuation values for PET before or after act 42. For example, a bilinear transformation is performed using a look-up table or a machine-learned network. PET energies are at or about 511 KeV, so the attenuation at this energy is determined from the CT data. The CT data is mapped, such as using a linear mapping function, from Hounsfield units to attenuation at 511 KeV. An image processor generates a 511 KeV attenuation map from the CT data. A virtual or mutual monoenergetic image at 511 KeV, substantially 511 KeV (i.e., within 25 KeV of 511 KeV), or at or substantially at another PET energy is generated.

In act 42, an image processor aligns the CT data with the PET data. The image processor applies a machine-learned model to align. The machine-learned model is a deep learned neural network. In one embodiment, the machine-learned model is a generator of a GAN. Other machine-learned models may be used.

The CT data and PET data or features derived therefrom are input to the machine-learned model. In response to the input, the machine-learned model generates an output. The output is a deformation field representing a non-rigid spatial transform between the CT data and the PET data. Alternatively, the machine-learned model outputs the deformed or spatially transformed CT or PET data.

The output by the machine-learned model is based on the previously performed machine training. Different training data, architecture definition, type of training, and/or training settings result in different values of the learnable parameters, so result in different machine-learned models. By having been trained based on comparison of attenuation corrected PET formed with alignment output by the model in training to ground truth (i.e., known good quality) attenuation corrected PET, the machine-learned model more likely outputs deformation or alignment information that will not lead to artifacts. The CT data is registered with the PET data by the machine-learned model in a way less likely to result in poor attenuation correction.

The alignment is performed by the machine-learned model. Other parts of the defined architecture used in training may not be used. For example, the machine-learned model is a generator of a GAN. The discriminator, while providing for a better performing generator through training, is not used in application or alignment. The discriminator performs the comparison for feedback in training and is not used in application. The generator may also be trained using similarity measures, such as based on landmark location, between the output and a ground truth.

As another example, the training of the machine-learned model may have benefited from an approximation of attenuation correction, such as use of the attenuation correction network 37 of FIG. 3. The machine-learned model was trained using a machine-learned network configured to output an attenuation corrected PET dataset in response to input of CT information and PET information. The machine-learned network may not be trained with the machine-learned model for alignment but is instead used in the training of the model. This machine-learned network is not used in the application, so is not used in aligning the CT and PET data in act 42.

In act 44, the image processor or another processor reconstructs an attenuation corrected PET image of the patient from the PET data. The reconstructing uses an attenuation map from the CT data. The CT data as aligned is mapped to attenuation, or the CT data is mapped to attenuation, which is aligned with the PET data. The PET data is corrected for attenuation from the attenuations provided by the CT data and aligned based on deformation provided by the machine-learned model. After alteration of the PET data for attenuation correction, the altered PET data is used to reconstruct the distribution of emissions from within the patient.

The image processor reconstructs an image of the patient from the PET data. For example, the image of the patient is reconstructed from the TOF data for the LORs and the attenuations. The image may be voxels, pixels, or other values that may be used to generate a display image (i.e., information in the object domain). The image or object space is reconstructed. The activity distribution in three-dimensions is reconstructed. The activity distribution is used for imaging, such as volume rendering, multi-planar reconstruction, or planar imaging.

Any reconstruction may be used. In one embodiment, the reconstruction is a Poisson iterative reconstruction, such as a maximum likelihood reconstruction. OSEM, FORE, or other reconstructions may be used. The reconstruction estimates the object or patient space from the PET data of the LORs. The detected events are used to iteratively determine the object space using forward, backward, or forward and backward projection.

The reconstruction is a function of the attenuation map. The reconstruction accounts for the attenuation using attenuation correction functions (ACFs), attenuation coefficients, or other attenuation values for the LORs or voxels. The PET data is altered based on the attenuation map. The amplitude of the PET data is changed (e.g., increased) to account for the amount of attenuation by the tissue and/or objects through which the photon passed. The alteration may be in the projection domain, such as to start reconstruction. The altered PET data is used for reconstruction. The alteration may be in the image domain, such as applied in object space in one or more iterations of the reconstruction. The altered PET data is used to determine changes in distribution in the object space for further iterations transforming between the projection and image spaces. In one embodiment, the objective function for the reconstruction makes use of attenuation information. The alteration may be to an output of the reconstruction.

In act 38, an attenuation corrected PET image is displayed. The reconstructed activity or emission distribution is used to create a PET image. The image is formed from reconstructing the object space and then rendering or imaging from the reconstructed object. The image is of the patient, such as a PET image showing function or uptake of the radiopharmaceutical. The image benefits from attenuation correction using accurately aligned CT and PET data.

The image is rendered, such as three-dimensional rendered, from the voxels of the reconstruction to a two-dimensional display image. Alternatively, multi-planar reconstruction or planar imaging uses data representing a plane or planes in the reconstructed object to generate a two-dimensional image for the two-dimensional display.

The PET image may be displayed with a CT image. For example, a CT image is generated from the same view point, field of view, and/or rendered volume as the PET image. The images may be displayed adjacent to each other. Alternatively, the PET image is color mapped and overlaid on or combined with the CT image.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for attenuation correction in positron emission tomography, the method comprising:
   acquiring, with a positron emission tomography (PET) scanner, PET data along lines-of-response from emissions in a patient;
   acquiring, with a computed tomography (CT) scanner, CT data for the patient;
   aligning, by a machine-learned model, the CT data with the PET data, the machine-learned model comprising a generative adversarial network including a generator configured to receive the CT data and the PET data and to output a deformation field, an attenuation correction network configured to generate attenuation corrected PET data using at least the output of the generator, and a discriminator configured to discriminate between the output of the attenuation correction network and corrected PET data and ground truth attenuation corrected PET, wherein the generator is trained based on loss including feedback from the discriminator;

reconstructing an attenuation corrected PET image of the patient from the PET data, the reconstructing being a function of an attenuation map from the CT data after the aligning; and displaying the attenuation corrected PET image.

2. The method of claim 1 wherein aligning comprises registering the CT data with the PET data.

3. The method of claim 1 wherein the generator is further trained based on a similarity of landmark locations.

4. The method of claim 1 wherein the attenuation correction network was not trained with the machine-learned model and is not used in aligning the CT data with the PET data for the patient.

5. The method of claim 1 wherein aligning comprises aligning by the machine-learned model comprising a deep-learned neural network.

6. The method of claim 1 wherein reconstructing comprises altering the PET data based on the attenuation map and reconstructing from the altered PET data.

7. A method for machine training registration of computed tomography (CT) with positron emission tomography (PET), the method comprising:

defining a generative adversarial network comprising a generator, an attenuation correction network, and a discriminator, the generator outputting a deformation field for the registration, the attenuation network inputting the deformation field and outputting attenuation corrected PET data, and the discriminator discriminating between attenuation corrected PET data and ground truth attenuation corrected PET;

training the generative adversarial network; and storing the generator of the trained generative adversarial network.

8. The method of claim 7 wherein defining comprises defining the generative adversarial network as a first neural network, the discriminator comprising a second neural network with convolutional and fully-connected layers.

9. The method of claim 7 wherein training comprises training with a similarity loss for the generator and a quality of the attenuation corrected PET data for the discriminator.

10. The method of claim 7 further comprising aligning, by the generator, CT data for a patient with PET information for the patient, the aligning performed without the discriminator.

11. A method for machine training registration of computed tomography (CT) with positron emission tomography (PET), the method comprising:

defining a generator network to output a deformation field in response to input of CT data and PET data;

machine training the generator network using an attenuation correction network configured to output an attenuation corrected PET in response to input of the deformation field, and a discriminator network configured to discriminate between the attenuation corrected PET and ground truth attenuation corrected PET; and storing the machine-trained generator network.

12. The method of claim 11 wherein machine training the generator comprises training based on discrimination by the discriminator of a quality of the attenuation corrected PET data and based on a similarity from the deformation field.

13. The method of claim 11 wherein the attenuation correction network is previously trained and fixed during the machine training of the generator network.

14. The method of claim 11 further comprising aligning CT information for a patient with PET information for the patient, and reconstructing a PET image from the PET information using an attenuation map from the CT information as aligned.

* * * * *